(12) United States Patent
Gonzalez-Santini

(10) Patent No.: US 12,463,577 B2
(45) Date of Patent: Nov. 4, 2025

(54) METHOD AND SYSTEM FOR CONTROLLING AN INVERTER FOR AN ELECTRIC MACHINE

(71) Applicant: GM GLOBAL TECHNOLOGY OPERATIONS LLC, Detroit, MI (US)

(72) Inventor: Nomar S. Gonzalez-Santini, Lakeland, FL (US)

(73) Assignee: GM Global Technology Operations LLC, Detroit, MI (US)

( * ) Notice: Subject to any disclaimer, the term of this patent is extended or adjusted under 35 U.S.C. 154(b) by 479 days.

(21) Appl. No.: 17/944,399

(22) Filed: Sep. 14, 2022

(65) Prior Publication Data

US 2024/0088817 A1 Mar. 14, 2024

(51) Int. Cl.
| | |
|---|---|
| *H02P 21/34* | (2016.01) |
| *H02P 21/18* | (2016.01) |
| *H02P 27/12* | (2006.01) |
| *H02P 27/14* | (2006.01) |

(52) U.S. Cl.
CPC .............. *H02P 27/12* (2013.01); *H02P 21/18* (2016.02)

(58) Field of Classification Search
CPC .................................. H02P 21/34; H02P 21/22
See application file for complete search history.

(56) References Cited

U.S. PATENT DOCUMENTS

| | | | | |
|---|---|---|---|---|
| 7,061,134 B2* | 6/2006 | Hiti | ...................... | H02M 7/5387 290/44 |
| 11,750,081 B2* | 9/2023 | Zhou | ...................... | H02M 7/797 363/56.01 |
| 2008/0297100 A1* | 12/2008 | Hiti | .................... | H02M 7/53875 363/40 |

* cited by examiner

*Primary Examiner* — Kawing Chan
*Assistant Examiner* — Charles S Laughlin
(74) *Attorney, Agent, or Firm* — Quinn IP Law

(57) ABSTRACT

A system and method for controlling a rotary electric machine include determining a rotational speed is below a low speed threshold, wherein the low speed threshold is determined based upon a semiconductor junction temperature. A first control parameter is determined when the rotational position of the rotary electric machine is within a first range of rotational positions, wherein the first range of rotational positions is determined based upon a first junction temperature in the diodes of the inverter and a second junction temperature in the power switches of the inverter. A second control parameter is determined when the rotational position is outside of the first range of rotational positions. One of the first control parameter or the second control parameter is selected based upon the rotational position of the rotary electric machine, and the electric power inverter is operated in a zero vector modulation (ZVM) mode based thereon.

18 Claims, 4 Drawing Sheets

METHOD AND SYSTEM FOR CONTROLLING AN INVERTER FOR AN ELECTRIC MACHINE

INTRODUCTION

An inverter may be employed to generate by multiple alternating current (AC) waveforms that pass through phase leads to an electric machine, e.g., a multi-phase rotary electric machine. The electric machine may be employed to generate traction torque or reactive torque. The multiple AC waveforms operate at the same frequency and amplitude, but with a time offset or phase shift between the different phases. The phased AC waveforms are transferred to individual stator windings of the rotary electric machine to induce a changing magnetic field. This magnetic field causes the rotation of a rotor to occur, which in turn provides motor output torque or regenerative torque. The motor output torque may be harnessed and directed as needed to perform useful work, e.g., propelling an electrified vehicle.

One form of inverter is a voltage source inverter (VSI), which employs power switches to transform direct current (DC) electrical power to AC electrical power. Under certain operating conditions, such as low speed, high torque operation, heat may be generated in the power switches of the inverter. When operating at low or zero output frequency, the average voltage produced by the inverter is low in comparison to the DC link voltage, but the output current might be at a rated current.

Thermal management issues related to power switches within the inverter may arise when the inverter operates at low or zero output frequency due to slowly changing AC current. Under such conditions, a power switch in the inverter might be required to carry maximum rated current continuously or for an extended time period, causing constant high power dissipation inside the power switch.

One known solution to manage temperature in an inverter is to time-limit operation at zero output frequency and full output current. However, this solution may be problematic for electrified vehicle operation because it limits the time during which maximum torque can be applied to the electric motor under stall conditions or during vehicle launch.

SUMMARY

There is a need to control electric power to an electric machine that operates at very low frequencies or at a DC state to compensate for variations in semiconductor junction temperatures and to maximize available torque. This includes a need to control electric power to a rotary electric machine that operates at very low output frequencies, for example at stall speeds and/or low speeds, to compensate for variations in semiconductor junction temperatures and to maximize available torque over the complete range of electrical rotation and mechanical rotation.

The concepts described herein provide a method, apparatus, and system for controlling an inverter to control electric power to a rotary electric machine at stall speeds and/or low speeds in a manner that is responsive to a rotational position of a rotor of the electric machine to compensate for variations in semiconductor junction temperatures and to maximize available torque over the range of electrical rotation and mechanical rotation.

An aspect of the disclosure includes a system for controlling a rotary electric machine that includes an electric power inverter having a plurality of power switches arranged in parallel with a plurality of diodes, wherein the electric power inverter is operatively connected to the rotary electric machine. A controller is operatively connected to the plurality of power switches of the electric power inverter and in communication a plurality of sensors that are arranged to monitor the rotary electric machine. The controller includes an instruction set that is executable to determine a rotational speed of the rotary electric machine, and thus determine that the rotary electric machine is operating at a rotational speed that is less than a low speed threshold, wherein the low speed threshold is determined based upon a semiconductor junction temperature in the electric power inverter. A rotational position of the rotary electric machine is determined. A first control parameter for the electric power inverter is determined when the rotational position of the rotary electric machine is within a first range of rotational positions of the rotary electric machine, wherein the first range of rotational positions of the rotary electric machine is determined based upon one of a first junction temperature in the plurality of diodes of the electric power inverter and a second junction temperature in the plurality of power switches of the electric power inverter. A second control parameter for the electric power inverter is determined when the rotational position of the rotary electric machine is outside of the first range of rotational positions of the rotary electric machine. One of the first control parameter or the second control parameter is selected based upon the rotational position of the rotary electric machine, and the electric power inverter is operated in a zero vector modulation (ZVM) mode employing the one of the first control parameter or the second control parameter that is selected to control the rotary electric machine to generate torque.

Another aspect of the disclosure may include a method for controlling an electric power inverter that is arranged to supply electric power to a rotary electric machine. The method includes determining operation of the electric power inverter in a low output frequency state; determining a rotational position of the rotary electric machine; determining a zero vector modulation control parameter for the electric power inverter based upon the rotational position of the rotary electric machine; and operating the electric power inverter in a zero vector modulation (ZVM) mode employing the zero vector modulation control parameter to control the rotary electric machine to generate torque.

Another aspect of the disclosure may include a method for controlling an electric power inverter arranged to supply electric power to a rotary electric machine that includes determining that the rotary electric machine is operating at a rotational speed that is less than a low speed threshold, wherein the low speed threshold is determined based upon a semiconductor junction temperature in the electric power inverter, and determining a rotational position of the rotary electric machine. A first zero vector modulation control parameter is determined for the electric power inverter when the rotational position of the rotary electric machine is within a first range of rotational positions of the rotary electric machine, wherein the first range of rotational positions of the rotary electric machine is determined based upon one of a first junction temperature in a diode of the electric power inverter or a second junction temperature in a power switch of the electric power inverter. A second zero vector modulation control parameter is determined for the electric power inverter when the rotational position of the rotary electric machine is outside of the first range of rotational positions of the rotary electric machine. One of the first zero vector modulation control parameter or the second zero vector modulation control parameter is selected based upon the rotational position of the rotary electric machine, and the electric power inverter is operated in a zero vector modulation (ZVM) mode employing the one of the first zero vector modulation control parameter or the second zero vector modulation control parameter that is selected to control the rotary electric machine to generate torque.

Another aspect of the disclosure may include determining a first zero vector modulation control parameter for the electric power inverter when the rotational position of the rotary electric machine is within a first range of angular positions, and operating the electric power inverter in the zero vector modulation (ZVM) mode employing the first zero vector modulation control parameter to control the rotary electric machine to generate torque.

Another aspect of the disclosure may include the first zero vector modulation control parameter being a first duty cycle.

Another aspect of the disclosure may include the first zero vector modulation control parameter being a first frequency.

Another aspect of the disclosure may include determining a second zero vector modulation control parameter for the electric power inverter when the rotational position of the rotary electric machine is outside of a first range of angular positions, and operating the electric power inverter in a zero vector modulation (ZVM) mode employing the second zero vector modulation control parameter to control the rotary electric machine to generate torque.

Another aspect of the disclosure may include the second zero vector modulation control parameter being a second duty cycle.

Another aspect of the disclosure may include the second zero vector modulation control parameter being a second frequency.

Another aspect of the disclosure may include operating the electric power inverter in the zero vector modulation (ZVM) mode employing the zero vector modulation control parameter to control the rotary electric machine to generate torque when a rotational speed of the rotary electric machine is less than a threshold rotational speed.

Another aspect of the disclosure may include determining that the electric power inverter is operating the electric machine at a rotational speed that is less than a low speed threshold, wherein the low speed threshold is determined based upon a semiconductor junction temperature in the electric power inverter.

Another aspect of the disclosure may include the rotational position of the rotary electric machine being an electrical rotational position.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

Figure 1:
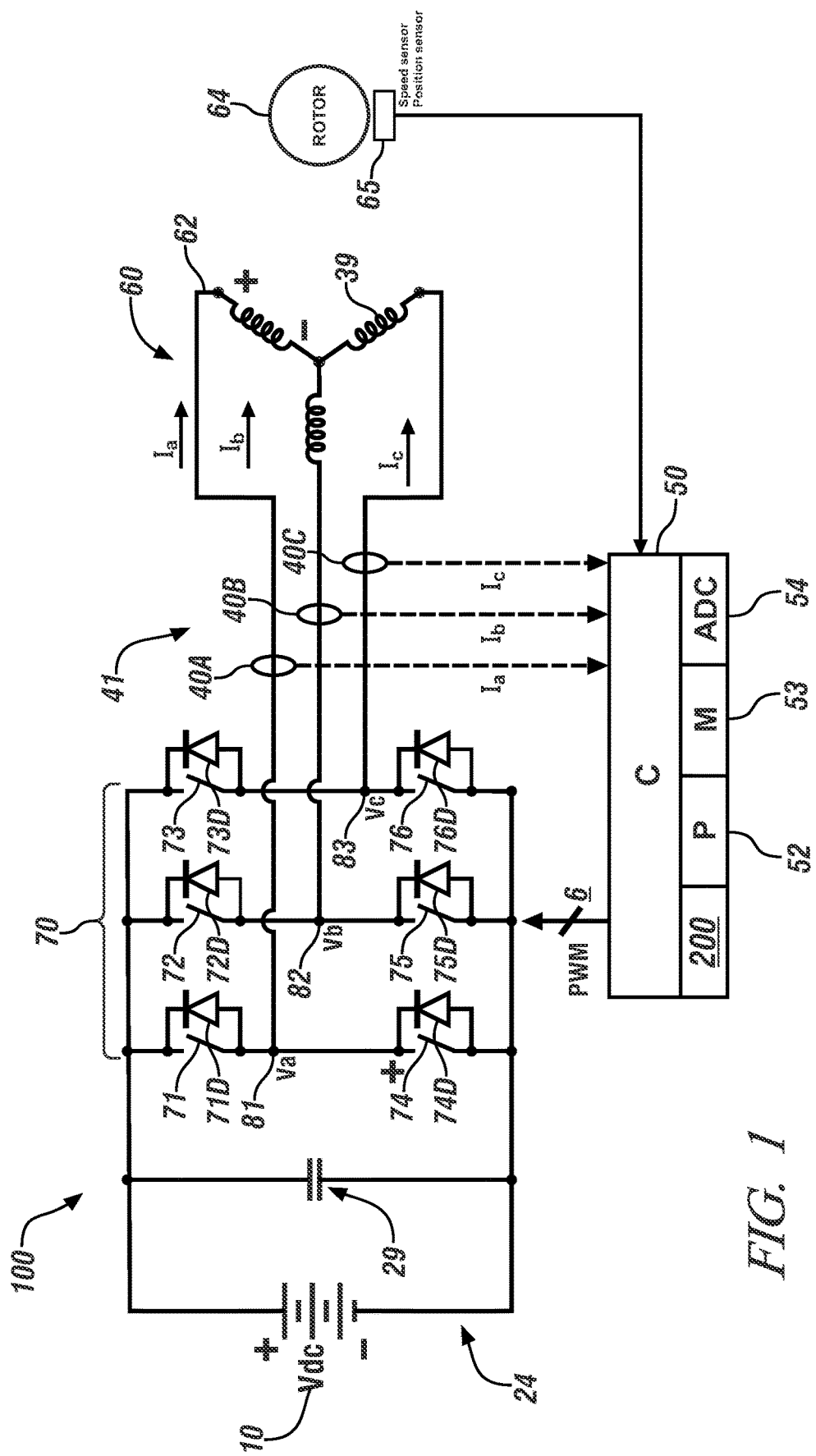
FIG. 1 schematically illustrates a multi-phase electric machine and control system, in accordance with the disclosure.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein. Throughout the drawings, corresponding reference numerals indicate like or corresponding parts and features.

As used herein, the term "system" may refer to one of or a combination of mechanical and electrical actuators, sensors, controllers, application-specific integrated circuits (ASIC), combinatorial logic circuits, software, firmware, and/or other components that are arranged to provide the described functionality.

Exemplary embodiments may be described herein in terms of functional and/or logical block components and various processing steps. Such block components may be realized by a combination or collection of mechanical and electrical hardware, software, and/or firmware components configured to perform the specified functions. For example, an embodiment may employ various combinations of mechanical components and electrical components, integrated circuit components, memory elements, digital signal processing elements, logic elements, look-up tables, or the like, which may carry out a variety of functions under the control of one or more microprocessors or other control devices. In addition, those skilled in the art will appreciate that the exemplary embodiments may be practiced in conjunction with other mechanical and/or electronic systems, and that the vehicle systems described herein are merely exemplary embodiment of possible implementations.

The use of ordinals such as first, second and third does not imply a ranked sense of order, but rather distinguishes between multiple instances of an act or a structure.

Referring to the drawings, wherein like reference numerals correspond to like or similar components throughout the several Figures, FIG. 1, consistent with embodiments disclosed herein, illustrates a non-limiting example of a multi-phase motor drive system 100. In one embodiment, the multi-phase motor drive system 100 may be disposed to provide propulsion torque in an electrified vehicle, with a multi-phase electric machine 60 being a traction motor that provides propulsion torque. The electrified vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

The multi-phase motor drive system 100 includes a rechargeable energy storage device (RESS) 10, the multi-phase rotary electric machine (electric machine) 60, an inverter 70, and a controller (C) 50. The inverter 70 transforms DC electric energy from the RESS 10 to AC electric energy that is supplied to phases of the multi-phase rotary electric machine 60 to generate torque in response to control commands from the controller 50. The controller 50 includes one or multiple instruction sets that may be programmed in software and is equipped with hardware to execute the instruction sets to control the inverter 70 to control the electric machine 60, including a Zero Vector Modulation (ZVM) control routine 200.

The RESS 10 is a rechargeable device, e.g., a multi-cell lithium ion battery or nickel metal hydride battery.

The electric machine 60 includes, in one embodiment, an annular-shaped stator 62 that forms a cylindrically-shaped void into which a coaxial rotor 64 is inserted, with an airgap formed between the stator and the rotor. The stator 62 houses a plurality of electrical windings 39 that are circumferentially arranged. A rotational position sensor 65 is arranged to monitor rotational position of the rotor 64. The electrical windings are electrically connected to the inverter 70, which is controlled by controller 50 to generate rotating electrical fields that induce magnetic fields adjacent to the rotor 64 and interact with the magnetic field of the permanent magnets to generate mechanical torque in the rotor 64. The electric machine 60 may be controlled to operate as a torque motor and/or an electric power generator. Details related to a physical configuration and operation of embodiments of the electric machine 60 are known to those skilled in the art, and thus not described in detail herein.

The inverter 70 is configured as a plurality of power switches that are arranged as a plurality of power switch pairs that electrically connect in series between the positive and negative conductors of a high-voltage DC bus 24 including capacitor 29, which are connected to the RESS 10. As shown, the electric machine 60 is configured as a three-phase device, and the inverter 70 includes three power switch pairs, each of which is connected to one of the phases (e.g., Phase A, Phase B, or Phase C) of the electric machine 60. As shown, a first power switch pair includes a first power switch 71 that is joined at node 81 to a fourth power switch 74 and defines phase A, a second power switch pair includes a second power switch 72 that is joined at node 82 to a fifth power switch 75 and defines phase B, and a third power switch pair includes a third power switch 73 that is joined at node 83 to a sixth power switch 76 and defines phase C. Each of the aforementioned power switches 71, 72, 73, 74, 75, 76 is a semiconductor device having a respective diode 71D, 72D, 73D, 74D, 75D, 76D arranged in parallel. Each of the power switches 71, 72, 73, 74, 75, 76 is in the form of a bi-polar junction transistor arranged as an N-type semiconductor sandwiched between two P-type semiconductors (PNP transistor) or, alternatively, a P-type semiconductor sandwiched between two N-type semiconductors (NPN transistor). Each of the diodes 71D, 72D, 73D, 74D, 75D, 76D is arranged as a single PN device. In certain embodiments, diodes 71D, 72D, 73D, 74D, 75D, 76D may be omitted.

Each of the power switches 71, 72, 73, 74, 75, 76 may be an Insulated Gate Bipolar Transistor (IGBT), or another suitable high-voltage switch, e.g., a Field-Effect Transistor (FET), a Silicon-Carbide (SiC) FET, etc., without limitation. The controller 50 includes an inverter gate drive circuit having a plurality of gate drives and a controller, wherein the inverter gate drive circuit generates control signals to control activation and deactivation of the power switches 71, 72, 73, 74, 75, 76 in response to the control signals, e.g., pulsewidth-modulated (PWM) control signals, which originate from the controller 50. The inverter 70 includes other electrical components including capacitors, resistors and other electrical circuit components to accomplish functions related to electrical noise suppression, load balancing and the like.

The inverter 70 may employ pulsewidth-modulating (PWM) control of the power switches 71, 72, 73, 74, 75, 76 to convert stored DC electric power originating in the RESS 10 to AC electric power to drive the rotary electric machine 60 to generate torque. Similarly, the inverter 70 converts mechanical power transferred to the rotary electric machine 60 to DC electric power to generate electric energy that is storable in the RESS 10, including as part of a regenerative braking control strategy when employed on-vehicle. The power inverter 70 receives motor control commands from the controller 50 and controls inverter states to provide the motor drive and regenerative braking functionality.

The inverter 70 may be operationally controlled in one of several different operating modes, including, e.g., a linear modulation mode or an over-modulation mode. One example of a linear modulation mode of operation is a space vector PWM (SVPWM) mode with linear modulation, e.g., up to 90% of a six-step operation, and one example of an over-modulation mode is a discontinuous or full six-step mode. The PWM inverter 70 may also be controlled in a Zero Vector Modulation (ZVM) mode. Details of the ZVM mode are described with reference to FIG. 2.

Table 1 represents operation of an embodiment of the inverter 70, and includes switching space vectors ($V_0$ through $V_7$) that are associated with activation or deactivation of the aforementioned power switches within each of the phases (Phase A, Phase B, Phase C) for the switching combinations. Each phase represents two current bi-directional, voltage unidirectional power switches with one switch within the phase being open while the other switch within the phase being closed.

TABLE 1

| Vector | State | Phase A | Phase B | Phase C |
|---|---|---|---|---|
| $V_0$ | Zero | 0 | 0 | 0 |
| $V_1$ | Active | 1 | 0 | 0 |
| $V_2$ | Active | 1 | 1 | 0 |
| $V_3$ | Active | 0 | 1 | 0 |

TABLE 1-continued

| Vector | State  | Phase A | Phase B | Phase C |
|--------|--------|---------|---------|---------|
| $V_4$  | Active | 0       | 1       | 1       |
| $V_5$  | Active | 0       | 0       | 1       |
| $V_6$  | Active | 1       | 0       | 1       |
| $V_7$  | Zero   | 1       | 1       | 1       |

In Table 1, a "0" indicates that the upper switch of the indicated phase is open (deactivated) and the lower switch within the phase is closed (activated), and a "1" indicates that the upper switch of the indicated phase is closed (activated) and the lower switch within the phase is opened (deactivated). Table 1 additionally includes a status column for each state. The status column indicates either a "Zero" or an "Active" status. An active status indicates that a switching configuration resulting in a net voltage being applied to the load. A zero status indicates a switching configuration resulting in the load being effectively shorted. Use of either or both the zero state switching space vectors ($V_0$, $V_7$) is referred to as zero vector modulation (ZVM). The zero state switching space vectors ($V_0$, $V_7$) are selected periodically at a zero vector modulation frequency $F_{ZVM}$ and zero vector modulation duty cycle $D_{ZVM}$ to reduce power dissipation in the switch carrying the greatest current.

Each of the power switches 71, 72, 73, 74, 75, 76 may have a first temperature sensor that is arranged to monitor temperature at or near a P-N junction thereof and is in communication with the controller 50. Each of the first temperature sensors may be a thermistor, a thermocouple junction, or another temperature monitoring device, without limitation. Alternatively, the temperature at or near the P-N junction may be determined by modelling, estimation, or by another process. Likewise, each of the diodes 71D, 72D, 73D, 74D, 75D, 76D may have a second temperature sensor that is arranged to monitor temperature at or near a P-N junction thereof, and is in communication with the controller 50. Each of the second temperature sensors may be a thermistor, a thermocouple junction, or another temperature monitoring device, without limitation. Alternatively, the temperature at or near the P-N junction of the respective diode may be determined by modelling, estimation, or by another process.

The phase currents delivered to the electric machine 60 via conductors 41 are individually and separately measured via phase current sensors 40A, 40B, 40C using a measurement process. The phase current sensors 40A, 40B, 40C may be Hall effect sensors in one embodiment.

The controller 50 includes a processor (P) 52 and tangible, non-transitory memory (M) 53 on which is recorded instructions embodying the ZVM control routine 200. The controller 50 may also include an analog-to-digital converter (ADC) 54. The ADC 54 may be embodied as an electrical circuit providing a specific sampling rate which provides quantization of the continuous/analog voltage input and outputs a representative digital signal. The memory 53 may include read-only memory (ROM), flash memory, optical memory, additional magnetic memory, etc., as well as random access memory (RAM), electrically-programmable read only memory (EPROM), a high-speed clock, analog-to-digital (A/D) and/or digital-to-analog (D/A) circuitry, input/output circuitry or devices, and signal conditioning and buffer circuitry.

The controller 50 commands the inverter 70 to generate a set of pulsewidth-modulated signals (arrow PWM). These PWM signals provide switching control of the input voltage to power the multi-phase electric machine 60. The controller 50 receives the three measured phase current signals from the phase current sensors 40A, 40B, 40C.

The term "controller" and related terms such as microcontroller, control, control unit, processor, etc. refer to one or various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which can be accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link, or another communication link. Communication includes exchanging data signals, including, for example, electrical signals via a conductive medium; electromagnetic signals via air; optical signals via optical waveguides; etc. The data signals may include discrete, analog and/or digitized analog signals representing inputs from sensors, actuator commands, and communication between controllers.

The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and similar signals that are capable of traveling through a medium.

The terms "calibration", "calibrated", and related terms refer to a result or a process that correlates a desired parameter and one or multiple perceived or observed parameters for a device or a system. A calibration as described herein may be reduced to a storable parametric table, a plurality of executable equations or another suitable form that may be employed as part of a measurement or control routine.

A parameter is defined as a measurable quantity that represents a physical property of a device or other element that is discernible using one or more sensors and/or a physical model. A parameter can have a discrete value, e.g., either "1" or "0", or can be infinitely variable in value.

At a stall condition, i.e., when the electric machine 60 is at or near zero rotational speed, phase currents become DC quantities in which an average power loss per phase is unequal and is dependent on the rotor position. As such, power loss is not evenly distributed between the upper and lower semiconductor devices of the specific power switch pair of the inverter 70. This may induce thermal stress on the inverter 70.

Figure 2:
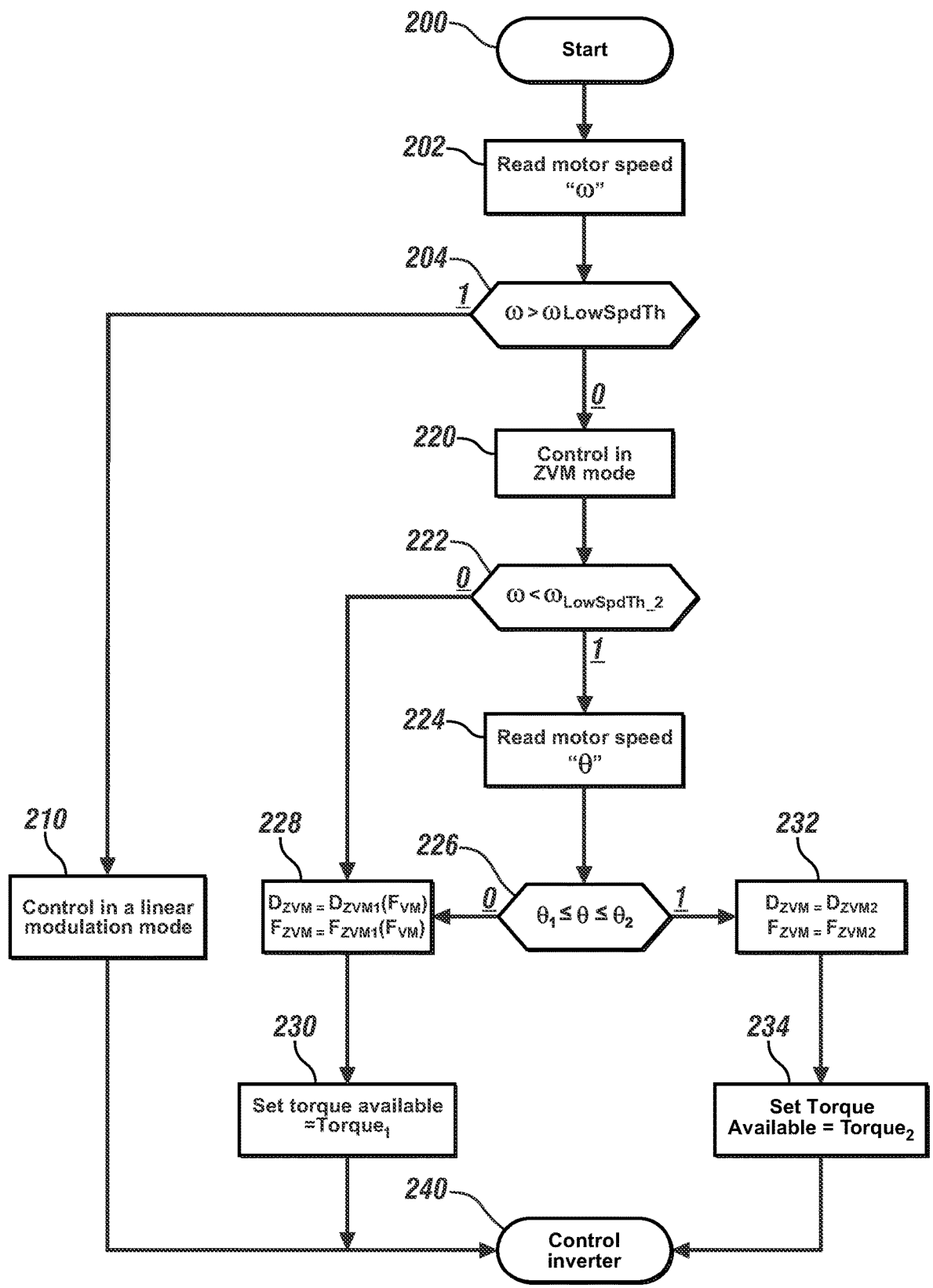
FIG. 2 schematically illustrates a control routine, in the form of a flowchart, for controlling operation of a multi-phase motor drive system, in accordance with the disclosure.

Referring now to FIG. 2, a non-limiting embodiment of the ZVM control routine 200 is now described in detail with continued reference to the multi-phase motor drive system 100 of FIG. 1. The concepts described herein may be implemented via software, hardware, or a combination thereof. Furthermore, the decisions may be based upon calibrated values or employing a feedback loop using information from sensors that capture instantaneous rotor position.

The ZVM control routine 200 periodically executes to control operation of the inverter 70. Each iteration, motor speed ($\omega$) and motor position ($\theta$) of the electric machine 60 are determined by monitoring signal output from the rotational position sensor 65 (Step 202).

The motor speed is evaluated to determine whether the electric power inverter 70 is operating in a low output frequency state, i.e., whether the inverter 70 is operating at a low frequency and/or at a low pulsewidth-modulation duty cycle to achieve a motor speed that is at or near a stall speed (Step 204). This includes comparing the motor speed to a first low speed threshold ($\omega_{LowSpdTh\_1}$), wherein the first low speed threshold is associated with a low rotational speed of the rotor 64 or a stall speed, i.e., not rotating. The low speed threshold is determined based upon a semiconductor junction temperature in the electric power inverter 70, wherein the semiconductor junction temperature is a junction temperature determined for one of the power switches 71, 72, 73, 74, 75, 76, a junction temperature for one of the diodes 71D, 72D, 73D, 74D, 75D, 76D, or another semiconductor junction temperature, without limitation. At rotational speeds greater than the second low speed threshold ($\omega_{LowSpdTh\_2}$), the semiconductor junction temperatures do not have time to react to rotor position changes, and thus the semiconductor junction temperatures approximate a constant value at steady state operation. At rotational speeds less than the second low speed threshold ($\omega_{LowSpdTh\_2}$), the semiconductor junction temperatures react to changes in the rotor position changes. Examples of the aforementioned semiconductor junction temperatures reacting to changes in the rotor position under selected operating conditions are graphically illustrated with reference to FIG. 3 and FIG. 4.

When the motor speed is greater than the first low speed threshold ($\omega_{LowSpdTh\_1}$) (204)(NO), the control routine commands operation in the linear modulation mode, the overmodulation mode, or the discontinuous mode to achieve a commanded torque and speed output from the electric machine 60 (Step 210), and commands control of the inverter 70 based thereon (Step 240).

When the motor speed is less than the first low speed threshold ($\omega_{LowSpdTh\_1}$) (204)(YES), the control routine commands operation of the inverter 70 in the Zero Vector Modulation (ZVM) mode (Step 220). The ZVM mode is employed to adjust power loss, and thus junction temperatures and junction temperature distribution of the semiconductor devices of the inverter 70. The reduction injunction temperatures and junction temperature distribution reduces inverter thermal stress, and thus enables increased torque output of the electric machine 60 at stall and very low speed conditions. The reduction injunction temperatures and adjustment of the junction temperature distribution is achieved employing two ZVM control parameters: ZVM duty cycle and ZVM frequency. Specifically, the ZVM duty cycle adjusts junction temperature magnitude of the semiconductor devices while ZVM frequency adjusts their junction temperature ripple. The ZVM duty cycle and the ZVM frequency are calibratable parameters.

When operating the inverter 70 in the ZVM mode (Step 220), the motor speed is compared to a second low speed threshold ($\omega_{LowSpdTh\_2}$), wherein the second low speed threshold is associated with a rotational speed of the rotor 64 that is low enough to enable control based upon rotational position ($\theta$) of the rotor 64, i.e., at or near the stall speed (Step 222).

When the motor speed is greater than the second low speed threshold ($\omega_{LowSpdTh\_2}$) (NO), a first ZVM duty cycle ($D_{ZVM1}$) and a first ZVM frequency ($F_{ZVM1}$) are selected for controlling the inverter 70 (Step 228), and an available torque output from the electric machine is set to a first torque level (Torque$_1$) (Step 230), and the control routine commands control of the inverter 70 based thereon (Step 240).

When the motor speed is less than the second low speed threshold ($\omega_{LowSpdTh\_2}$) (YES), the rotational position ($\theta$) of the rotor 64 is read (Step 224) and evaluated to determine whether it is within a first range of angular positions, which are defined as a first rotational position ($\theta_1$) and a second rotational position ($\theta_2$) (Step 226).

The first rotational position ($\theta_1$) and the second rotational position ($\theta_2$) are angular electrical degrees of rotation in one embodiment. Alternatively, the first rotational position ($\theta_1$) and the second rotational position ($\theta_2$) may be replaced with parameters that correspond to a rotational position of the rotor 64 in context of the concepts described herein. This may include, in one embodiment, phase current, semiconductor junction temperature, power loss distribution, and/or other parameters that can be monitored, estimated, or otherwise determined.

When the rotational position ($\theta$) of the rotor 64 is outside the first range of angular positions defined by the first rotational position ($\theta_1$) and the second rotational position ($\theta_2$) (Step 226)(NO), the first ZVM duty cycle ($D_{ZVM1}$) and the first ZVM frequency ($F_{ZVM1}$) are selected for controlling the inverter 70 (Step 228), and the available torque output from the electric machine is set to the first torque level (Torque$_1$) (Step 230), and the control routine commands control of the inverter 70 based thereon (Step 240). The first torque level (Torque$_1$) may change in response to the rotational position within the first range of angular positions.

When the rotational position ($\theta$) of the rotor 64 is within the first range of angular positions defined by the first rotational position ($\theta_1$) and the second rotational position ($\theta_2$) (Step 226)(YES), a second ZVM duty cycle ($D_{ZVM2}$) and a second ZVM frequency ($F_{ZVM2}$) are selected for controlling the inverter 70 (Step 232), and the available torque output from the electric machine is set to a second torque level (Torque$_2$) (Step 234), and the control routine commands control of the inverter 70 based thereon (Step 240).

FIG. 2 illustrates one embodiment of a process to adapt the ZVM control variables according to the effect that the rotor position has in the inverter's junction temperature distribution at stall or low-speed conditions. It is appreciated that the first range of angular positions that is defined by the first rotational position ($\theta_1$) and the second rotational position ($\theta_2$) are described in terms of mechanical degrees of rotation, but the control of the inverter 70 is defined in terms of electrical degrees of rotation that are defined by the quantity of electrical poles in the electric machine 60. Thus, there are multiple instances of the first range of angular positions and the second range of angular positions in context of the mechanical rotation of the rotor 64 of the electric machine 60, depending upon the quantity of electrical poles in the electric machine 60.

Figure 3:
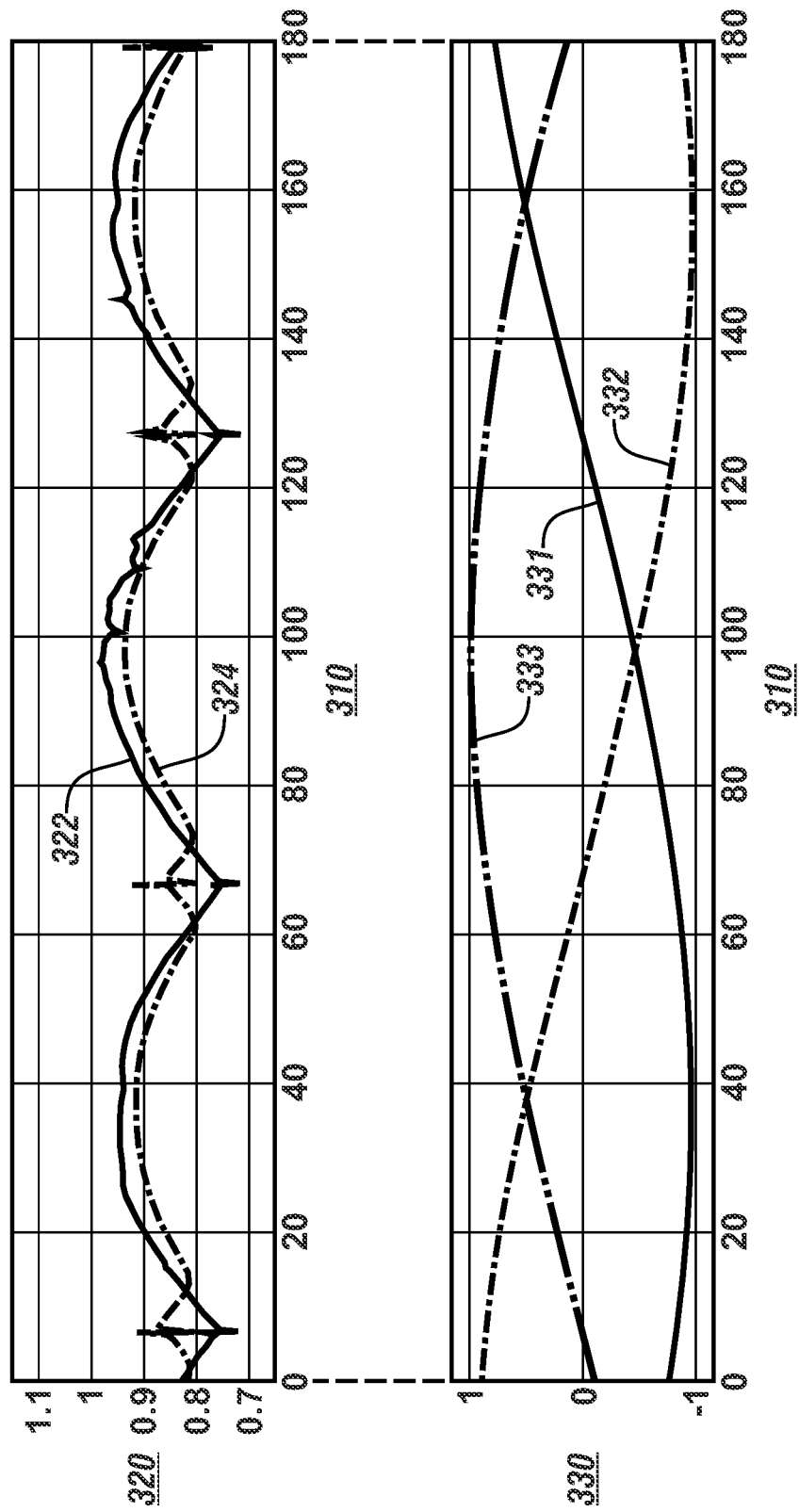
FIG. 3 graphically illustrates semiconductor junction temperatures and inverter phase currents in relation to rotor position for an electric power inverter and electric machine of a multi-phase motor drive system that is operating near a stall condition, in accordance with the disclosure.

FIG. 3 graphically illustrates semiconductor junction temperatures 320 and inverter phase currents 330 in relation to rotor position 310 (in electrical degrees of rotation) for an embodiment of the electric power inverter 70 that is described herein. The phase currents 330 include phase A current 331, phase B current 332, and phase C current 333. The semiconductor junction temperatures 320 include a maximum power switch junction temperature 322, which is a maximum value of the switch junction temperatures for the power switches 71, 72, 73, 74, 75, 76. The semiconductor junction temperatures also include a maximum diode junction temperature 324, which is a maximum value of the switch junction temperatures for the diodes 71D, 72D, 73D, 74D, 75D, 76D. This data indicates that there is a non-constant junction-temperature distribution in relation to rotor position for a given stall or low speed condition. At certain rotational positions, the maximum junction temperature is defined by the switch junction temperatures, and at other rotational positions, the maximum junction temperature is defined by the diode junction temperatures. As such, using the same set of ZVM parameters (duty cycle and frequency) over the full range of 360° of electrical rotation is not optimum at a given speed. Instead, the rotational positions used to define the first range of angular positions are determined based upon which of the switch junction temperatures or the diode junction temperatures defines the maximum junction temperature. This defining of the first range of angular positions enables operation at a higher overall torque output across the full 360° of electrical rotation.

Figure 4:
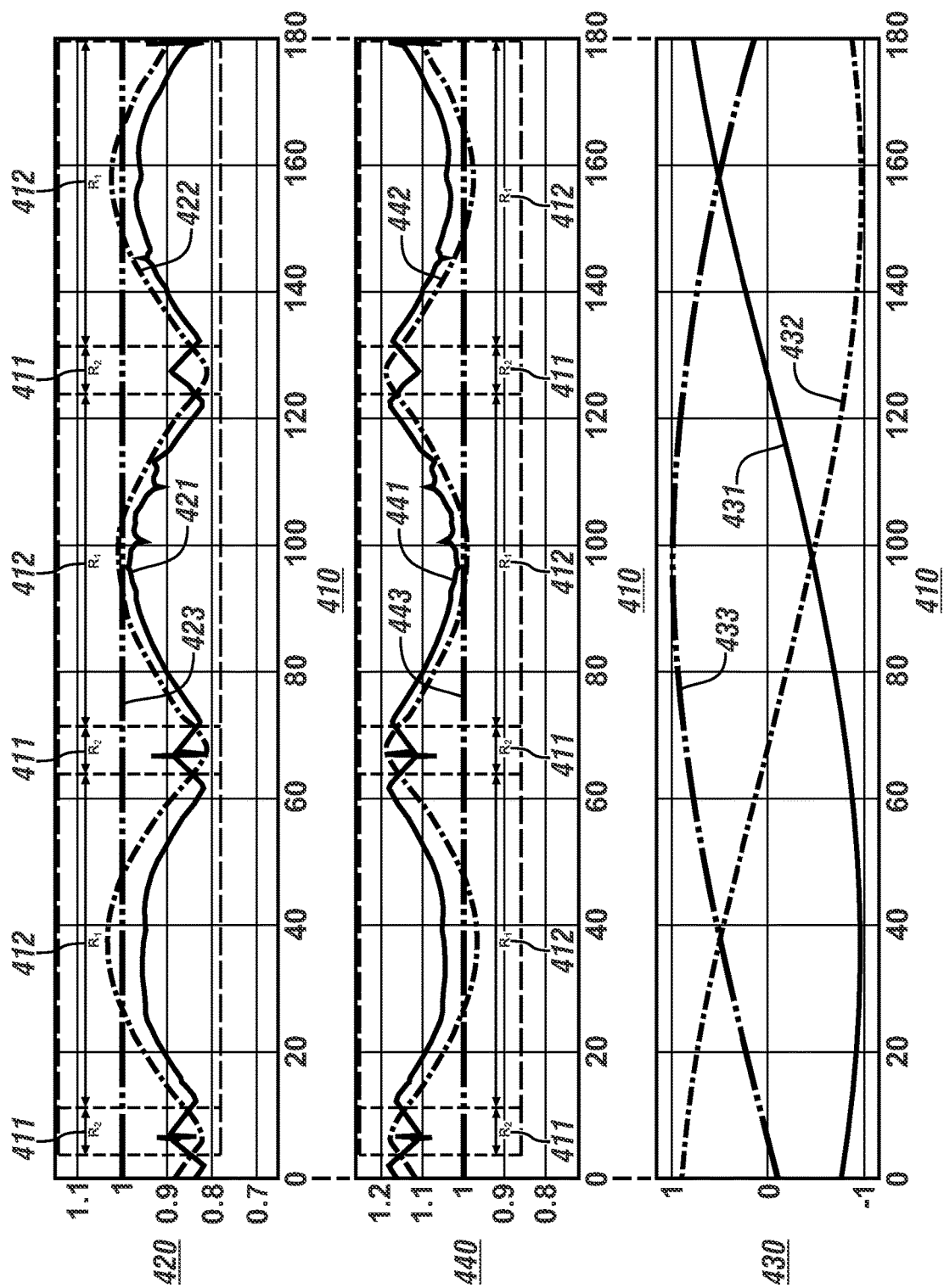
FIG. 4 graphically illustrates semiconductor junction temperatures, inverter phase currents, and motor torque in relation to rotor position for an electric power inverter and electric machine of a multi-phase motor drive system that is operating near a stall condition, in accordance with the disclosure.

FIG. 4 graphically illustrates semiconductor junction temperatures 420, inverter phase currents 330, and motor torque 440 in relation to rotor position 410 (in electrical degrees of rotation) for an embodiment of the electric power inverter 70 that is described herein. The phase currents 430 include phase A current 431, phase B current 432, and phase C current 433. The semiconductor junction temperatures 420 include a first maximum power switch junction temperature 421, which is a maximum value of the switch junction temperatures for the power switches 71, 72, 73, 74, 75, 76 and the switch junction temperatures for the diodes 71D, 72D, 73D, 74D, 75D, 76D when operating at the first ZVM duty cycle ($D_{ZVM1}$) and the first ZVM frequency ($F_{ZVM1}$) are selected for controlling the inverter 70 and with available torque output from the electric machine being set to the first torque level ($Torque_1$), as described with reference to Step 228 and Step 230 of FIG. 2, referred to hereinafter as ZVM1.

The semiconductor junction temperatures 420 include a second maximum power switch junction temperature 422, which is a maximum value of the switch junction temperatures for the power switches 71, 72, 73, 74, 75, 76 and the switch junction temperatures for the diodes 71D, 72D, 73D, 74D, 75D, 76D when operating at the second ZVM duty cycle ($D_{ZVM2}$) and the second ZVM frequency ($F_{ZVM2}$) with the available torque output from the electric machine being set to the second torque level ($Torque_2$), as described with reference to Step 232 and Step 234 of FIG. 2, referred to hereinafter as ZVM2.

The semiconductor junction temperatures 420 include a junction temperature limit 423, which is a maximum design junction temperature for the semiconductors, i.e., the power switches and the diode.

This data may be employed to define the rotational positions associated with the first range of angular positions 411, which are based upon using the switch junction temperatures to define the maximum junction temperature. The maximum junction temperature is determined to be a maximum of the semiconductor junction temperatures of the switch and the diode. This data may be employed to define the rotational positions associated with the second range of angular positions 412, which are based upon using the diode junction temperatures to define the maximum junction temperature.

The motor torque 440 graphs includes a first motor torque 441 that is available when operating at ZVM1, a second motor torque 442 that is available when operating at ZVM2, and a baseline motor torque 443, which is independent of the rotor position. This data indicates that the motor torque can be increased above the baseline motor torque 443 during operation in relation to and based upon the rotor position. This enables operation at a higher overall torque output across the full 360° of electrical rotation.

When it comes to comparing between ZVM1 and ZVM2, it can be observed that the torque availability achieved by using ZVM1 is not necessarily higher when compared against the torque availability achieved by using ZVM2. This means that just using ZVM1 leaves out torque available that can be utilized. Therefore, when using the proposed application of ZVM strategy, the software should apply ZVM1 and corresponding torque available for the rotor positions in regions "R1" 412, and swap to ZVM2 and corresponding torque available for the rotor positions in regions "R2" 411. By doing this, highest torque available for each rotor position can be obtained and therefore improved utilization of the ZVM mode and hardware is achieved over the 360° electrical rotation. The extra torque available allowing for operation of ZVM2 at rotor position regions "R2" 411 could be just what a truck needs to make a final "push" to climb a rock or just move a heavy load. Absolute benefits of the proposed ZVM strategy will depend on semiconductor device thermal and electrical properties.

Stall is the most thermally-challenged speed for the inverter. Zero vector modulation (ZVM) is used at stall or low speed conditions to balance the junction temperature of the semiconductor devices within the inverter and minimize the maximum junction temperature for a given torque. ZVM adds two control variables (i.e., ZVM duty cycle and frequency) that can be optimized to maximize vehicle stall-torque capabilities for a given hardware.

The optimum values for the ZVM control variables are dependent upon inverter loss and thermal properties, and on the motor's rotor position (i.e., phase current distribution at a given time instant). Allowing the ZVM control variables to be determined in relation to the rotor position (or a derivative variable such as phase current, junction temperature, or power loss), a vehicle's torque capability will be higher compared to having fixed ZVM control variables.

The concepts described herein increases an electrified vehicle's stall-torque capability for a given hardware. Alternatively, a desired stall-torque capability may be achieved with a smaller inverter size.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. A method for controlling an electric power inverter arranged to supply electric power to an electric machine, the method comprising:

determining operation of the electric power inverter in a low output frequency state;
determining a rotational position of the electric machine;
determining a first zero vector modulation control parameter for the electric power inverter when the rotational position of the rotary electric machine is within a first range of rotational positions of the rotary electric machine;
determining a second zero vector modulation control parameter for the electric power inverter when the rotational position of the rotary electric machine is outside of the first range of rotational positions of the rotary electric machine;
operating, via a controller, the electric power inverter in a zero vector modulation (ZVM) mode employing the first zero vector modulation control parameter when the rotational position of the rotary electric machine is within the first range of rotational positions of the rotary electric machine; and
operating, via the controller, the electric power inverter in the ZVM mode employing the second zero vector modulation control parameter when the rotational position of the rotary electric machine is outside of the first range of rotational positions of the rotary electric machine.

2. The method of claim 1, wherein the first zero vector modulation control parameter comprises a first duty cycle.

3. The method of claim 1, wherein the first zero vector modulation control parameter comprises a first frequency.

4. The method of claim 1, wherein the second zero vector modulation control parameter comprises a second duty cycle.

5. The method of claim 1, wherein the second zero vector modulation control parameter comprises a second frequency.

6. The method of claim 1, further comprising operating the electric power inverter in the ZVM mode when a rotational speed of the electric machine is less than a rotational speed threshold.

7. The method of claim 6, wherein determining operation of the electric power inverter in the low output frequency state comprises determining that the electric power inverter is operating the electric machine at a rotational speed that is less than a low speed threshold, wherein the low speed threshold is determined based upon a maximum semiconductor junction temperature in the electric power inverter when the electric power inverter is operating the electric machine at the rotational speed that is less than the low speed threshold.

8. The method of claim 1, wherein the electric machine comprises a rotary electric machine.

9. The method of claim 1, further comprising operating the electric power inverter in the ZVM mode to control torque output of the electric machine based upon torque availability, wherein the torque availability is based upon the rotational position of the electric machine.

10. The method of claim 1, wherein the first range of rotational positions of the rotary electric machine is determined based upon a maximum of a plurality of first junction temperatures in a plurality of diodes of the electric power inverter and a plurality of second junction temperatures in a plurality of power switches of the electric power inverter.

11. A method for controlling an electric power inverter arranged to supply electric power to a rotary electric machine, the method comprising:
determining that the rotary electric machine is operating at a stall condition;
determining a rotational position of the rotary electric machine;
determining a first zero vector modulation control parameter for the electric power inverter when the rotational position of the rotary electric machine is within a first range of rotational positions of the rotary electric machine, wherein the first range of rotational positions of the rotary electric machine is determined based upon a maximum of a first junction temperature in a diode of the electric power inverter and a second junction temperature in a power switch of the electric power inverter when the electric power inverter is operating the electric machine at the stall condition;
determining a second zero vector modulation control parameter for the electric power inverter when the rotational position of the rotary electric machine is outside of the first range of rotational positions of the rotary electric machine;
operating, via a controller, the electric power inverter in a zero vector modulation (ZVM) mode employing the first zero vector modulation control parameter when the rotational position of the rotary electric machine is within the first range of rotational positions of the rotary electric machine; and
operating, via the controller, the electric power inverter in the ZVM mode employing the second zero vector modulation control parameter when the rotational position of the rotary electric machine is outside of the first range of rotational positions of the rotary electric machine.

12. The method of claim 11, wherein the first zero vector modulation control parameter comprises one of a first duty cycle and a first frequency.

13. The method of claim 11, wherein the second zero vector modulation control parameter comprises one of a second duty cycle and a second frequency.

14. The method of claim 11, further comprising operating the electric power inverter in the ZVM mode employing the zero vector modulation control parameter to control torque output of the electric machine based upon torque availability, wherein the torque availability is based upon the rotational position of the electric machine.

15. The method of claim 11, wherein the first junction temperature comprises a junction temperature in a diode of the electric power inverter, and wherein the second junction temperature comprises a junction temperature in a power switch of the electric power inverter.

16. A system for controlling a rotary electric machine, comprising
an electric power inverter having a plurality of power switches, wherein the electric power inverter is operatively connected to the rotary electric machine; and
a controller, operatively connected to the plurality of power switches of the electric power inverter and in communication a plurality of sensors that are arranged to monitor the rotary electric machine;
the controller including an instruction set, the instruction set executable to:
determine a rotational speed of the rotary electric machine,
determine the rotary electric machine is operating at a rotational speed that is less than a low speed threshold, wherein the low speed threshold is determined based upon a semiconductor junction temperature in the electric power inverter;

determine a second parameter for the rotary electric machine, wherein the second parameter corresponds to a rotational position parameter for the rotary electric machine;

determine a first control parameter for the electric power inverter when the second parameter is within a first range, wherein the first range for the second parameter is determined based upon a maximum of a first semiconductor junction temperature in the plurality of power switches and a second semiconductor junction temperature in the plurality of power switches of the electric power inverter when the electric power inverter is operating the electric machine at the rotational speed that is less than the low speed threshold;

determine a second control parameter for the electric power inverter when the rotational position of the rotary electric machine is outside of the first range of rotational positions of the rotary electric machine;

operate the electric power inverter in a zero vector modulation (ZVM) mode employing the first control parameter when the rotational position of the rotary electric machine is within the first range of rotational positions of the rotary electric machine; and operate the electric power inverter in the ZVM mode employing the second zero vector modulation control parameter when the rotational position of the rotary electric machine is outside of the first range of rotational positions of the rotary electric machine.

17. The system of claim 16, wherein the instruction set is executable to determine operation of the electric power inverter in a low output frequency state associated with a rotational speed that is less than a low speed threshold, wherein the low speed threshold is determined based upon the first semiconductor junction temperature in the electric power inverter.

18. The system of claim 16, further comprising the instruction set being executable to operate the electric power inverter in the ZVM mode employing a selected one of the first control parameter or the second control parameter to control torque output of the rotary electric machine based upon torque availability, wherein the torque availability is based upon the rotational position parameter of the rotary electric machine, and wherein the rotational position parameter comprises one of a rotational position, a phase current, the semiconductor junction temperature or a power loss distribution.

* * * * *